July 17, 1951   A. R. SEATON   2,561,144
FISH LURE SWIVEL
Filed May 15, 1948

INVENTOR.
A. R. SEATON
BY
Cook & Robinson
ATTORNEY

Patented July 17, 1951

2,561,144

UNITED STATES PATENT OFFICE 2,561,144

FISH LURE SWIVEL

Allan R. Sexton, Juneau, Alaska

Application May 15, 1948, Serial No. 27,331

2 Claims. (Cl. 287—103)

This invention relates to swivels, and it has reference more particularly to improvements in swivels of a type especially useful in connection with fish lures, such as plugs or spoons, for attaching the fish hooks to the lure, where a frequent change of hooks is necessary or desirable.

It is the principal object of my invention to provide a swivel of the character and for the purpose above stated, but not to be confined to that particular use, that has the following features and advantages:

It is a device that provides full swiveling action plus a substantial amount of universal action of connected parts.

It is not an extensive device and can be built and rigged through a wide range of lengths and sizes with little change in weight.

It is so designed that it gives a high ratio of strength to weight.

It permits easy application of closed ring hooks thereto, without use of tools or jump rings, and does not require soldering after a connection has been made.

It does not elongate under heavy loads as do the "corkscrew" type swivels now in general use.

Other objects of the device of the present invention are to be found in the details of construction of parts, in their relationship, combination and mode of use, as will hereinafter be fully described.

In accomplishing the above mentioned and other objects of the invention, I have provided the improved details of construction, the preferred forms of which are illustrated in the accompanying drawings, wherein.

Figure 1:
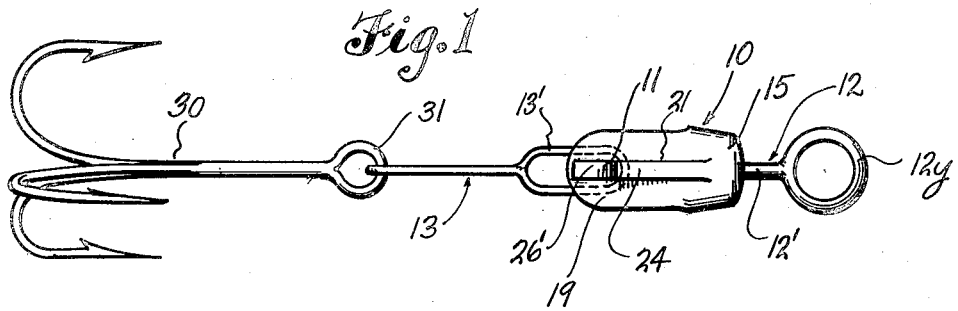
Fig. 1 is a view showing in side elevation, a swivel embodied by the present invention, with treble fish hooks attached thereto through an intermediate link.

Referring more in detail to the drawings:

The swivel of this invention comprises three principal parts, viz., a barrel, or body, designated in its entirety by reference numeral 10, a cross-pin 11, and an end pin 12 to which the fish lure, or leader, is to be attached. For certain uses, or as may be desired or required, there is also provided a looped link 13 for use in joining the fish hooks to the swivel, as has been shown in Figs. 1 and 2.

Figure 3:
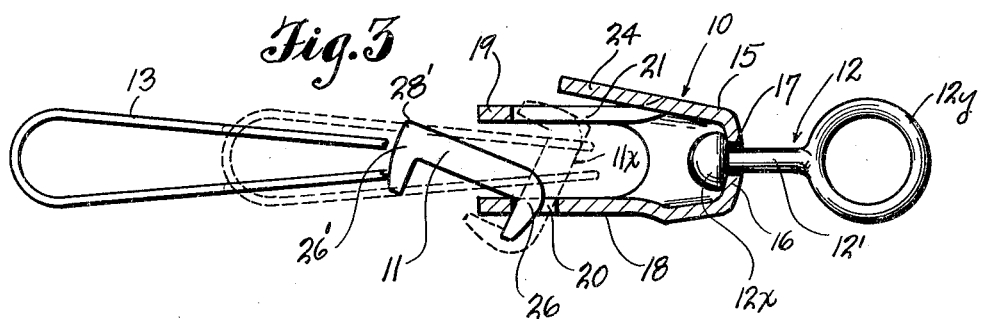
Fig. 3 is an enlarged, longitudinal section of the swivel, illustrating the mode of applying the cross-pin and link thereto.

The barrel 10 comprises a single-piece element that is die stamped from sheet metal stock of any suitable kind. It is formed at one end with a tubular and somewhat tapered body portion 15, closed at its smaller end, as seen in Fig. 3, by an end wall 16, and this is provided with a central opening 17. Extending from the opposite sides of the larger end portion of the body 15, in spaced, parallel relationship, are walls 18 and 19. The wall 18 is formed near its outer end with a longitudinal slot 20, and the opposite wall 19 is formed with a similar but elongated slot 21.

It is to be observed, more particularly by reference to Fig. 3, that a tongue 24 is struck outwardly from the metal stock in forming the slot 21, and this extends from the closed body portion 15 of the swivel along the slot or opening 21, in such manner as to permit it to operate as a filler for a substantial part of the slot so that the effective length of the slot or opening 21 may be decreased to substantially the same length as that of slot 20. That is, the tongue 24 may be sprung downwardly from the position in which it is shown in Fig. 3, to the position shown in Fig. 4, for a purpose presently explained. When the tongue is thus depressed, to the position of Fig. 4, the effective portion of the slot or opening 21 then is of the same length and directly opposite the slot 20, and the two slots are thus adapted to receive and hold therein the opposite end portions of the cross-pin 11, as shown best in Figs. 2 and 4.

Figure 2:
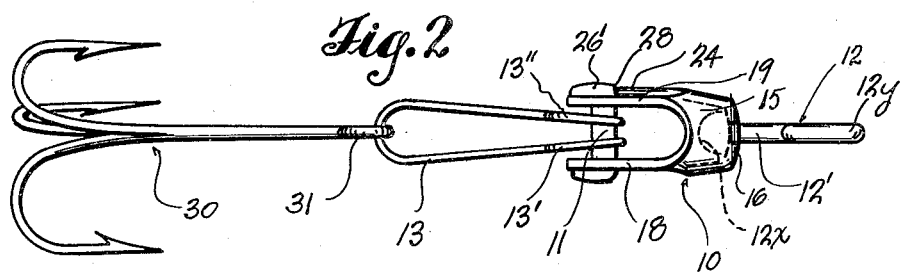
Fig. 2 is a bottom view of the parts as shown in Fig. 1.
Figure 4:
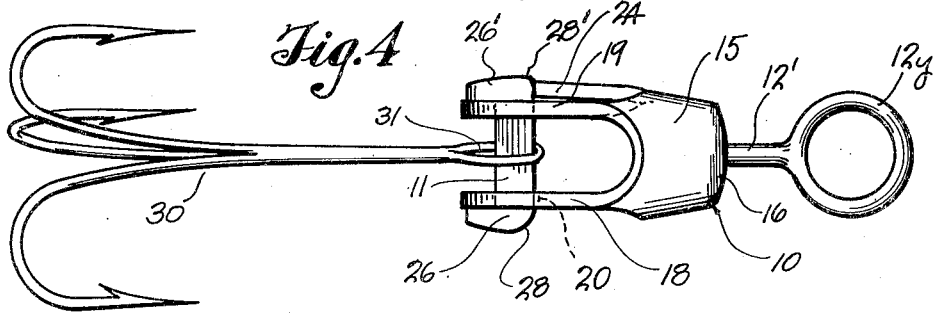
Fig. 4 is a side view of the present swivel, and hooks attached directly thereto.
Figure 5:
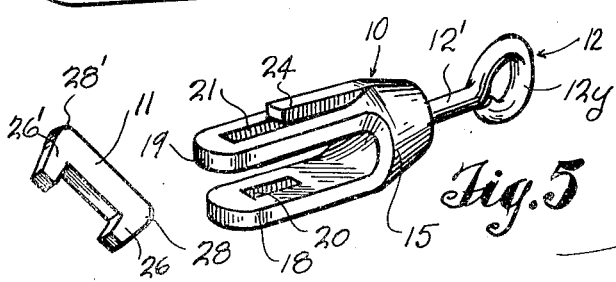
Fig. 5 is a perspective view of the swivel and cross pin.

The cross-pin 11 is here used for the attachment of fish hooks to the swivel either by direct connection as in Fig. 4, or through the mediacy of the link 13 as shown in Fig. 2.

The pin 11 comprises a flat metal bar, disposed through the swivel and edgewise thereof, with reference to the longitudinal direction of the swivel, and with opposite end portions thereof seated in the slots 20 and 21, respectively. At its ends, the bar has head portions 26—26' extended beyond one longitudinal edge of the bar, for engaging against the outer faces of the walls 18 and 19 beyond and in alignment with the slots 20—21. One of these head portions, here designated at 26, has a rounded corner as at 28, to facilitate the application of the bar or its removal from the slot 20. The opposite head, 26', has its corresponding corner portion 28' formed substantially square, for a purpose presently apparent.

The line attaching pin 12 is an article of standard equipment and is applied to the swivel by projecting its shank portion 12' through the opening 17 in the end wall 16 of the swivel barrel 15.

On the inner end of this pin is a retaining head 12x, and on its outer end a loop or ring 12y to which a line or leader, not shown, is to be attached.

In the present drawing, treble hooks are shown, at 30, and the attaching shank of these hooks has an end loop 31. In the event the hooks are to be attached to the swivel through the mediacy of the link 13, which link comprises a length of stainless steel wire that is bent back upon itself to U-form and formed at its ends with soldered loops 13'—13'', one end of the link is first pressed through the end eye 31 of the shank of the fish hooks and the eye seated at the base of the loop. Then the cross pin 11 is applied through the loops 13'—13'' of the link and the cross-pin is then applied to the swivel. This application of the cross-pin 11 is effected as indicated in Fig. 3, which shows that end portion of the pin that is formed with the rounded corner 28 to be extended into the open end of the swivel, and its hooked head portion passed outwardly through the slot 20 in wall 18. Then the opposite end of the cross pin is swung into the open end of the swivel, as to the dotted line position 11x in Fig. 3, then shifted upwardly and endwise through opening 21, and is then seated as in Fig. 4. With the cross-pin so seated, the tongue 24 is then pressed down from the position of Fig. 3, to position of Fig. 4, thus to engage the adjacent shouldered end 28' of the cross-pin 11 and thereby lock the pin against displacement from the swivel. When so seated there is not sufficient play of the pin 11 endwise of slot 20 to permit the head 26 to disengage the wall and so long as the tongue is depressed, the opposite end of the pin cannot disengage wall 19.

If it is not desired to use the link 13 for connecting the hooks 30 with the swivel, the cross-pin is applied to the eye 31 of the hook shank, and then the same mode of application of the cross-pin to the swivel is followed as above described, so as to attach the hooks as has been illustrated in Fig. 4.

With the hooks attached and the tongue 24 depressed, it is impossible for the ends of the cross-pin to become unseated. Therefore, the hooks cannot be detached. However, should it be desired to change or replace the hooks, it is merely required that a tool such as a knife blade be applied beneath the free end of the tongue 24, and the tongue pried up to the position of Fig. 3. Then the cross-pin can be removed by merely moving it through the various positions of application but in a reverse order to its mode of application.

The hooks when connected, either as shown in Fig. 2 or as in Fig. 4, will have the same degree of freedom.

Changes in overall length of swivel body and other parts, as well as other dimensions, can be made without departing from the spirit of the invention.

The main advantage in the present swivel aside from providing a strong, effective and useful swivel, resides in the ease and quickness provided for in making changes of hooks.

The device lends itself to various uses other than that shown, and it is not the intent that the invention be limited to any specific use.

Having thus described my invention, what I claim as new therein, and desire to secure by Letters Patent is:

1. A swivel coupling of the character described comprising a swivel body formed with spaced, opposite side walls, each wall being formed with an elongated, longitudinal slot in transverse alignment; a tongue struck from one wall for the elongation of the slot in that wall substantially beyond the inner end of the other slot, and a cross pin extended between said walls and formed with head portions at its opposite ends adapted to be passed through the slots and to engage against the outer surface of the walls; said tongue being adapted to be pressed into engagement with one of the head portions of the pin after the pin has been seated in the slots thereby retaining the pin in seated position.

2. A swivel coupling as in claim 1 wherein said tongue is bendable toward the slot to engage the upper head portion of the pin to prevent unseating thereof and bendable away from the slot to permit removal of the pin.

ALLAN R. SEATON.

REFERENCES CITED

The following references are of record in the file of this patent:

UNITED STATES PATENTS

| Number | Name | Date |
|---|---|---|
| 251,464 | Rogers | Dec. 27, 1881 |
| 432,735 | Helm | July 22, 1890 |
| 929,535 | Augustine | July 27, 1909 |
| 1,030,527 | Nelson | June 25, 1912 |